United States Patent [19]

Green et al.

[11] Patent Number: 5,710,841
[45] Date of Patent: Jan. 20, 1998

[54] METHOD FOR IMPROVING THE CONTRAST IN PHOTOGRAPHIC FILM MATERIALS

[75] Inventors: Andrew Green, Harrow; Peter Thomas Fry, Hemel Hempstead; Clare Elizabeth Scriven, Watford; Richard Arthur Sharman, Dunstable, all of United Kingdom

[73] Assignee: Eastman Kodak Company, Rochester, N.Y.

[21] Appl. No.: 536,332

[22] Filed: Sep. 29, 1995

[30] Foreign Application Priority Data

Oct. 13, 1994 [GB] United Kingdom ............... 9420654

[51] Int. Cl.$^6$ .................................................. G06T 5/00
[52] U.S. Cl. ................................ 382/274; 382/132
[58] Field of Search ........................ 382/274, 266, 382/254, 132; 358/520, 521, 448, 458, 302; 364/525

[56] References Cited

U.S. PATENT DOCUMENTS

| | | | |
|---|---|---|---|
| 4,907,288 | 3/1990 | Shimoni | 382/274 |
| 5,012,333 | 4/1991 | Lee et al. | 358/520 |
| 5,481,480 | 1/1996 | Green et al. | 364/525 |

Primary Examiner—Scott A. Rogers
Attorney, Agent, or Firm—William F. Noval

[57] ABSTRACT

Described herein is an arrangement for correcting the contrast of X-ray images to reveal details which are not otherwise visible. The arrangement comprises a conventional illumination box (10) for illuminating an X-ray (12), a camera arrangement (14) for viewing the illuminated X-ray film (12), the camera arrangement (14) including a camera unit (18) having a lens (20) mounted in a light tight box (16), a processing unit (22), and display means (24, 28) for displaying an image with the corrected contrast. The contrast is corrected using the characteristic curve of the processed film material on which the X-ray image is recorded in accordance with the following equation:

$$D = \frac{D_s}{[1 + \{E_i/E\}^{\beta}/\alpha]^{\alpha}}$$

where
 E is the exposure.
 D is the density at exposure E.
 $E_i$ is the exposure at the point of inflexion of the curve.
 $D_s$ is the density at saturation, and
 $\alpha$ and $\beta$ are characteristics relating to the processed photographic material.

2 Claims, 4 Drawing Sheets

METHOD FOR IMPROVING THE CONTRAST IN PHOTOGRAPHIC FILM MATERIALS

FIELD OF THE INVENTION

The present invention relates to a method for improving the contrast in photographic film materials and is more particularly concerned with the improvement of contrast in X-ray film materials, for example, X-ray film materials used in mammography.

BACKGROUND OF THE INVENTION

X-ray films are widely used to detect abnormalities in a patient, for example, broken or cracked bones. X-ray films are also used in breast screening programmes to produce mammograms from which the development of breast cancers can be detected.

In the special case of mammography, it is essential to make as accurate as is possible a diagnosis of all cancers in the breast tissue as soon as possible. However, the cancers which are found in breast tissue may take many different forms and are best judged by the human eye.

Traditionally, optical magnification devices and high intensity illumination devices are used to view X-ray film materials.

It has, however, been demonstrated that some forms of cancers present in breast tissue are formed in regions which are shown as very dark or very light areas on the mammogram, and as a result, these cancers are not readily visible. However, neither of the traditional viewing devices described above allows the film contrast to be adjusted to be able to view such areas of the mammogram.

U.S. Pat. No. 3,535,443 discloses X-ray image viewing apparatus in which an illuminated radiographic film is viewed with a video camera and the picture is displayed on a monitor. The video signals from a single camera are processed in several electronic stages to bring out information which is present but barely visible in the original film. Various stages are used to suppress video signal components which represent large areas of uniform film density to emphasise otherwise obscured details in such areas, to stretch the contrast range in either black or white picture areas, and to emphasise the boundaries defining areas of different contrast. The video camera is mounted for movement in two orthogonal directions so that the entire X-ray film can be viewed, and incorporates a zoom lens for looking at selected areas of the film in more detail.

EP-B-0 053 291 discloses an apparatus for viewing X-ray films in which the X-ray film is illuminated by a light source and a fixed television camera is used to produce a picture of the X-ray film on a display screen. The displayed image of the X-ray film can have varying contrast, brightness and/or negative-positive reversal.

PROBLEM TO BE SOLVED BY THE INVENTION

X-ray pictures are often rejected due to over- or under-exposure of the film material. This requires that the patient be subjected to further doses of X-ray radiation when the X-ray is re-made at the correct exposure.

Furthermore, the apparatus described in both U.S. Pat. No. 3,535,443 and EP-B-0 053 291 is not portable and cannot easily be used with conventional X-ray viewing equipment. Contrast adjustments made in U.S. Pat. No. 3,535,443 are not predictable due to the automatic gain control in the camera processing.

SUMMARY OF THE INVENTION

It is therefore an object of the present invention to provide a method and apparatus for viewing X-ray films which is portable and can be used with conventional X-ray viewing equipment. Moreover, at least a part of the apparatus can be hand-held and can be moved around the illuminated X-ray film to view areas which may be of particular interest.

It is therefore a further aspect of the present invention that the contrast in these areas of particular interest which would otherwise not be easily viewed using conventional techniques can be corrected so that they can be viewed. In particular, the characteristic curve of the X-ray film material is utilised to correct the contrast of these specific areas of interest.

In accordance with one aspect of the present invention, there is provided a method of correcting the contrast of a processed photographic film material using its characteristic curve, the method comprising the steps of:

a) illuminating the film material;

b) capturing an image of the illuminated film material using a camera unit;

c) producing an output signal corresponding the image captured by the camera unit;

d) correcting the contrast of the captured image to reveal hidden detail in the film; and e) displaying the corrected image of film, characterized in that step d) includes using the characteristic curve of the processed film material to correct the contrast, the characteristic curve of the material being defined by the equation:

$$D = \frac{D_s}{[1 + \{E_i/E\}^\beta/\alpha]^\alpha}$$

where

E is the exposure,

D is the density at exposure E, $E_i$ is the exposure at the point of inflexion of the curve, $D_s$ is the density at saturation, and $\alpha$ and $\beta$ are characteristics relating to the processed photographic material.

In accordance with another aspect of the present invention, there is provided apparatus for correcting the contrast of a processed photographic film material using its characteristic curve, the apparatus comprising:

illumination means for illuminating the film material;

camera means for capturing an image of the illuminated film material and producing an output signal corresponding the image captured;

processing means for correcting the contrast of the captured image to reveal hidden detail in the film material; and display means for displaying the corrected image of film, characterized in that the processing means utilises the characteristic curve of the processed photographic material to correct the contrast, the characteristic curve of the material being defined by the equation:

$$D = \frac{D_s}{[1 + \{E_i/E\}^\beta/\alpha]^\alpha}$$

where

E is the exposure,

D is the density at exposure E, $E_i$ is the exposure at the point of inflexion of the curve, $D_s$ is the density at saturation, and α and β are characteristics relating to the processed photographic material.

ADVANTAGEOUS EFFECT OF THE INVENTION

Advantageously, by using the characteristic curve of the photographic material being viewed to correct the contrast, more image detail can be seen than can normally be seen using ordinary optical viewing methods.

It is a particular advantage that the apparatus of the present invention is hand held and can easily be used without having to change standard working practices.

BRIEF DESCRIPTION OF THE DRAWINGS

For a better understanding of the present invention, reference will now be made, by way of example only, to the accompanying drawings in which.

DETAILED DESCRIPTION OF THE INVENTION

In a photographic process, it is common to illustrate the photographic response of a particular film, following development in that process, by a curve, sometimes called the "characteristic curve" for the material being measured. This characteristic curve represents the relationship between developed density and the logarithm of exposure, and is often referred to as the H & D curve, after Hurter and Driffield, *The Journal of the Society of Chemical Industry*, No.5, Vol. IX, 31st May 1890.

The "characteristic curve" for a particular photographic film is determined using a control strip as is well known in the art. The control strip is produced by taking a small piece of film and exposing it in a sensitometer by contact with an original step wedge, which has, typically, 21 densities in steps of 0.151log exposure units (for X-ray films, for example), with light of a colour appropriate to the type of film being used for process control (typically either blue or green for X-ray films). The exposed strip is processed in the processor whose performance is being monitored, and is then ready to be measured.

Figure 1:
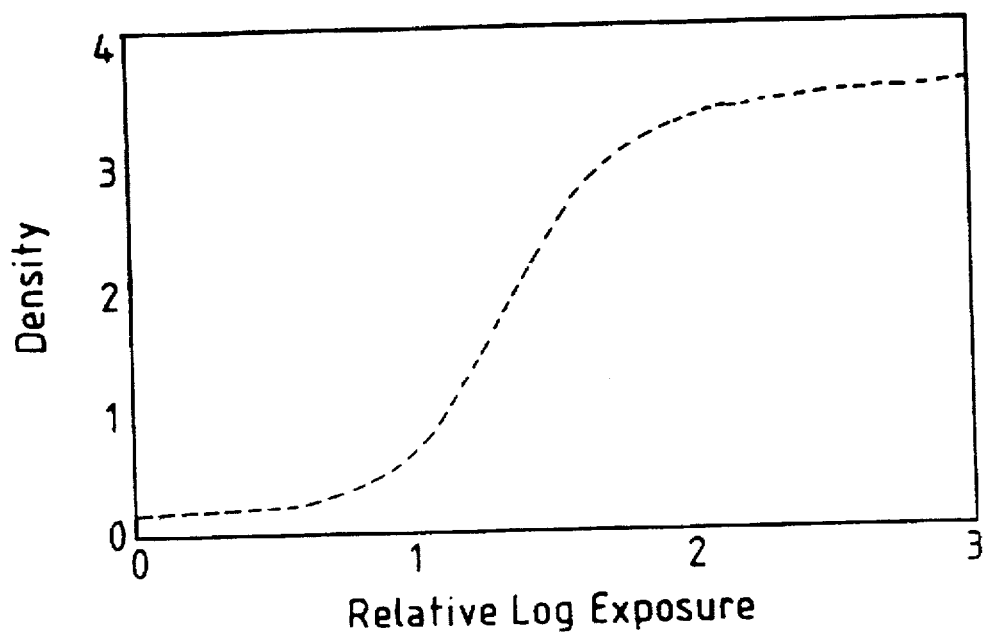
FIG. 1 illustrates a graph of density against relative log exposure for an X-ray film material.

Densities measured on the control strip are plotted against the relative log exposure, and important process control parameters from the resulting curve can be obtained which characterise the state of the process. A typical characteristic curve is shown in FIG. 1.

Published copending European patent application EP-A-0 601 626 describes a method of controlling a photographic processing apparatus when processing a given photographic material by using the characteristic curve for that material. The characteristic curve is determined from a control strip of the photographic material, and is produced by exposing the control strip to a step wedge, and processing the exposed strip in the processing apparatus to be controlled. Density values are measured from the processed control strip in relation to the exposure applied to the strip in the step wedge, and are plotted against the exposure to produce the characteristic curve for the material. The characteristic curve is defined by the equation:

$$D = \frac{D_s}{[1 + \{E_i/E\}^\beta/\alpha]^\alpha}$$

where

E is the exposure,

D is the density at exposure E, $E_i$ is the exposure at the point of inflexion of the curve, $D_s$ is the density at saturation, and α and β are characteristics relating to the photographic material.

Figure 2:
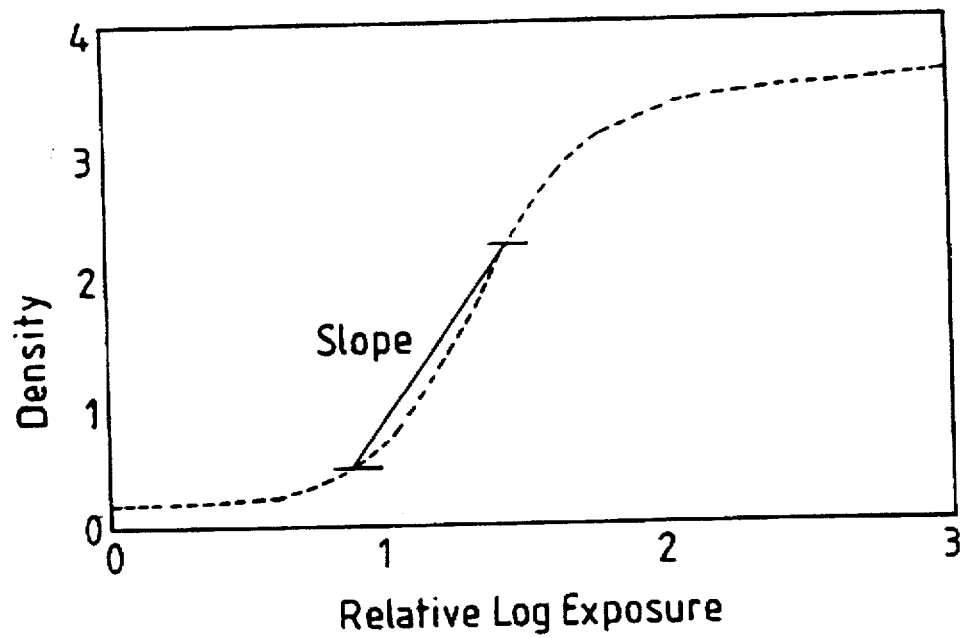
FIG. 2 illustrates the slope or contrast measurement for the graph of FIG. 1.

Slope or "contrast" indicates the range and level of discrimination between different exposures. For normal X-ray films for example, the slope is conventionally calculated between a point having a density value of 0.25 above the gross fog, and a second point 2.00 above gross fog as is shown in FIG. 2.

Figure 3:
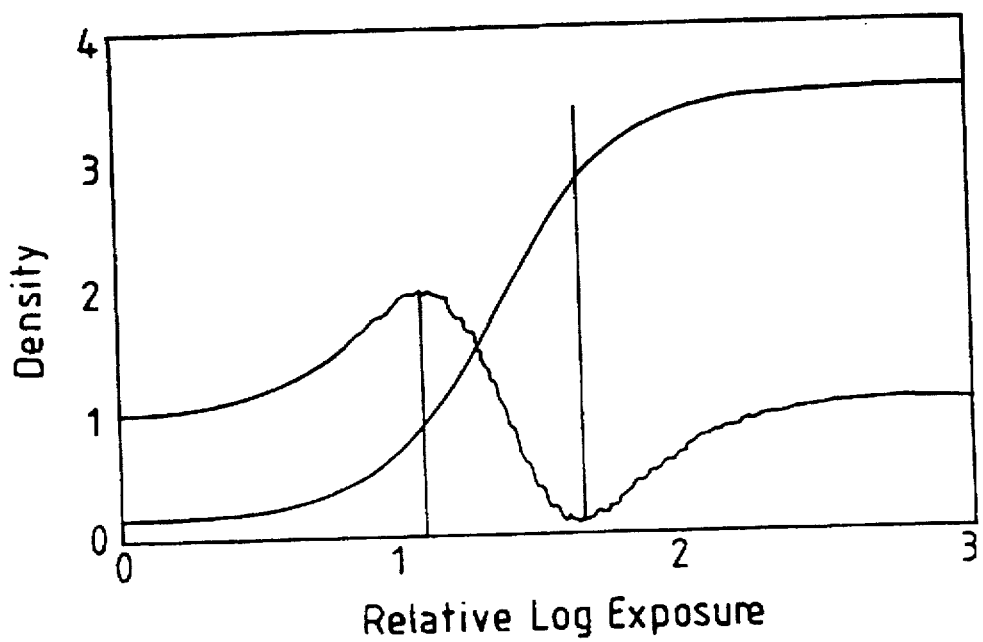
FIG. 3 illustrates the graph of FIG. 1 with a graph representing the second derivative of the curve on a different scale superimposed thereon.

Generally, the effective contrast, g, may be defined as:

$$g = \frac{D_{sh} - D_{sp}}{\log E_{sh} - \log E_{sp}}$$

where $D_{sh}$ and $D_{sp}$ are the respective densities at the minimum and maximum of the second differential of the density-relative log exposure curve shown in FIG. 3; and $\log E_{sh}$ and $\log E_{sp}$ are the respective exposure values on the relative log exposure axis corresponding to the densities at the minimum and maximum of the second differential of the curve.

Figure 4:
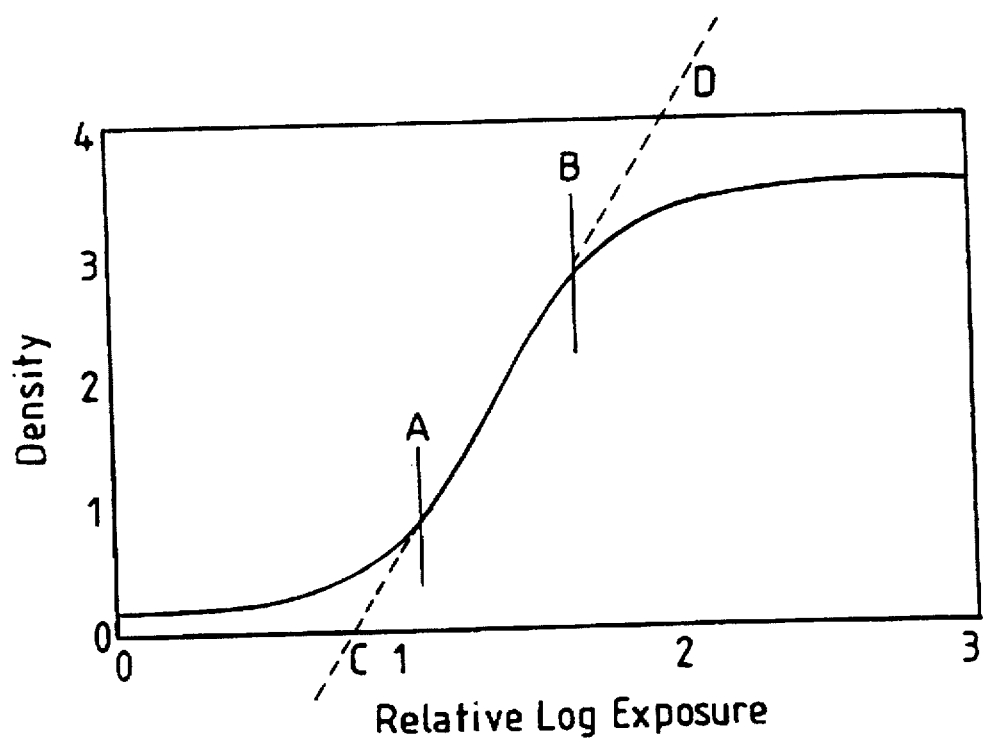
FIG. 4 is similar to FIG. 1 with the points marked which correspond to the maximum and minimum of the second derivative of the curve.

FIG. 4 is similar to FIG. 3 but with the second differential of the density-relative log exposure curve removed. Points 'A' and 'B' indicate the boundaries in which the film material has been exposed to optimise the contrast and correspond to the minimum and maximum of the second differential of the curve shown in FIG. 3. In this region, the eye is best at discriminating detail in an image with point 'A' corresponding to a 'black' image and point 'B' to a 'white' image. This is the normal display range. In the region of the curve below point 'A', the image is black or very dark. Similarly, in the region of the curve above point 'B', the image is white or very light. In both these regions outside the display range, discrimination of detail is difficult.

In accordance with the present invention, the regions outside the display range 'A–B' are 'straightened' out between points 'C' and 'A' and between points 'B' and 'D', as indicated by dotted lines in FIG. 4, and the display range can be moved along line 'C–D' accordingly. This has the effect of bringing the contrast of regions outside 'A–B' to the same value as those in the region 'A–B', that is, the display range.

Figure 5:
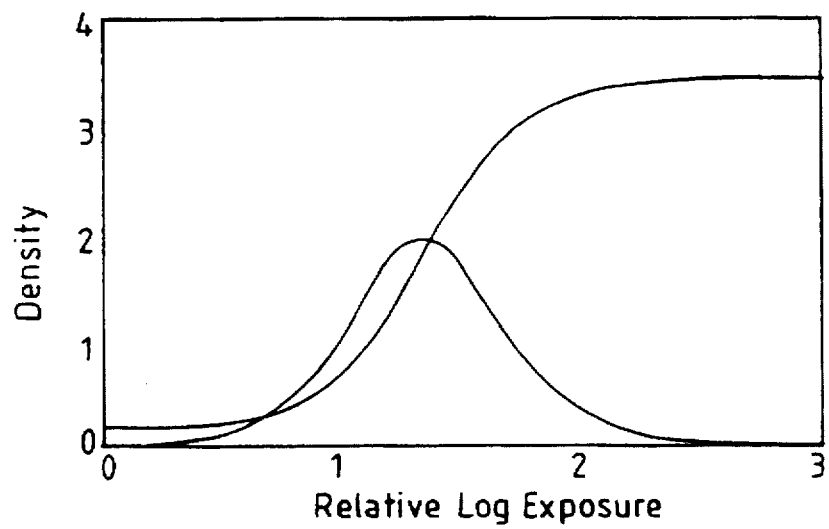
FIG. 5 illustrates the graph of FIG. 1 with a graph representing the first derivative of the curve on a different scale superimposed thereon.

It is also possible to define the contrast in a second way, as the slope, γ, at the inflexion point of the H & D curve (i.e. the maximum of the first differential) as shown in FIG. 5.

It follows that:

$$g = \frac{D_{sh} - D_{sp}}{\log E_{sh} - \log E_{sp}} \quad (i)$$

$$g = \frac{\beta(D_s - D_f)[(1 + [2/A])^{-\alpha} - (1 + \{A/2\alpha^2\})^{-\alpha}]}{2\log[A/2\alpha]}$$

where $D_s$ is the density at saturation, $D_f$ is the non-sensitometric density, and $$A = (3\alpha + 1) + \sqrt{(5\alpha + 1)(\alpha + 1)}$$

and that $$\gamma = \frac{\beta(D_s - D_f)}{\log_e[1 + (1/\alpha)]^{\alpha+1}}$$

or, more simply:

$$\gamma = \frac{\beta'(D_s - D_f)}{[1 + (1/\alpha)]^{\alpha+1}}$$

These equations are discussed in more detail in EP-A-0 601 626. In general, the latter expression for the contrast gives numerical values a little larger than those given by equation (i).

As discussed in EP-A-0 601 626, α is a measure of the asymmetry of the curve, and β, or perhaps more accurately its reciprocal, is essentially a measure of the latitude of the system.

In accordance with the present invention, the characteristic curve for a particular X-ray film is determined from a processed control strip of the same X-ray film material. The control strip is prepared as described in EP-A-0 601 626 and discussed earlier. The values of α and β are then determined for the processed X-ray film material and takes into account variations in the process for producing the X-ray film to be viewed.

Figure 6:
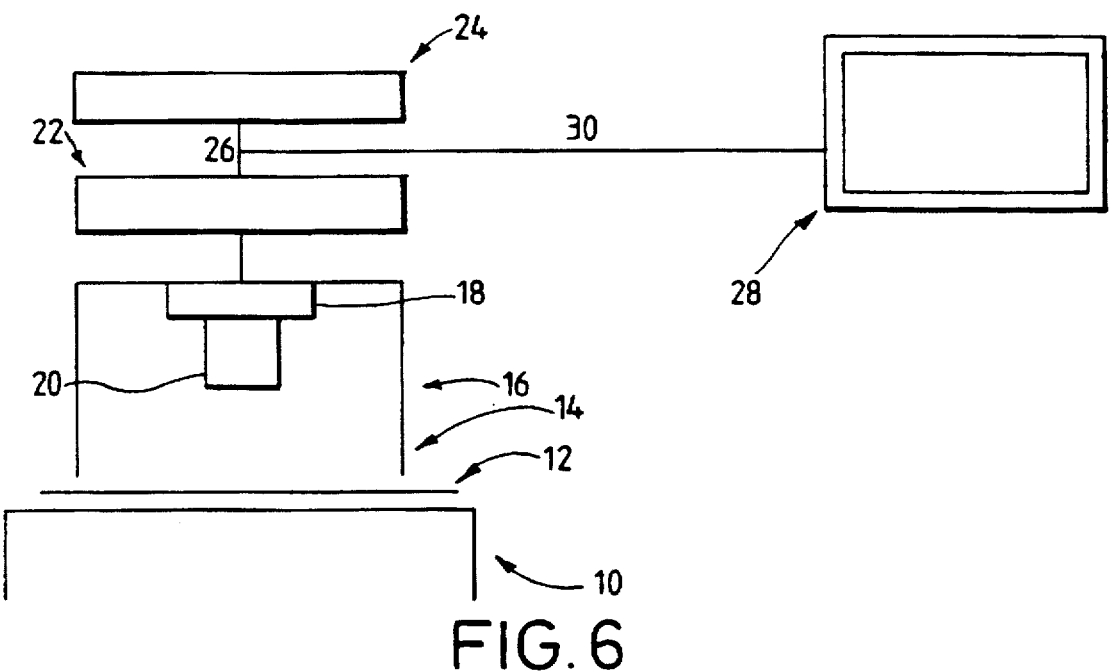
FIG. 6 is a schematic diagram of apparatus in accordance with the present invention.

In FIG. 6, apparatus in accordance with the present invention is shown. The apparatus comprises a conventional X-ray film illuminator 10 on which an X-ray film 12 is placed for illumination. A camera arrangement 14 is positioned over the surface of the film 12, the camera arrangement 14 comprising a light proof box 16, a camera unit 18 and a lens 20. The light proof box 16 is open at one end where it is placed over the X-ray film 12 to be examined. The lens 20 focuses an image from the surface of the X-ray film 12 on to the camera unit 18 and may form an integral part of the camera unit itself. The camera unit 18 provides a video output signal indicative of the portion of the X-ray film 12 which is being viewed. The camera unit 18 may also include exposure control.

The camera unit 18 may be a video camera providing a video output signal as described above, but any other suitable scanner can be used, for example, a flat bed scanner. The camera unit may also comprise a digital camera.

The exposure control of the camera unit 18 may be adjusted either automatically or manually to provide the correct video level therefrom. In this way, even detail in the dark areas of the X-ray film 12 can be examined. If the exposure control of the camera unit 18 is automated, details in the high density areas of the film 12 can be seen without the need for an operator to make manual adjustments. An exposure control output signal corresponding to the level of the exposure control of the camera unit is used in the correction of the contrast of the X-ray film 12 to be viewed. This is described more fully later.

The camera arrangement 14 is connected to a processing unit 22 which processes the output signals from the camera unit 18 and provides a signal for a local viewer display 24 which is connected to the camera arrangement 14. The processing unit 22 is used to extend the contrast of the image or to emphasise detail, where appropriate, in accordance with the exposure control signal from the camera unit 18. The operation of the processing unit 22 will be described in more detail later.

The processing unit 22 and local viewer display 24 may be mounted directly on the camera arrangement 14 (not illustrated) or connected thereto by a connecting lead 26. The display 24 can be a liquid crystal display (LCD).

The processing unit 22 can also be connected to a television display 28 by a connecting lead 30. The television display 28 may be located remote from the rest of the apparatus and may be used for group discussion or teaching purposes.

Figure 7:
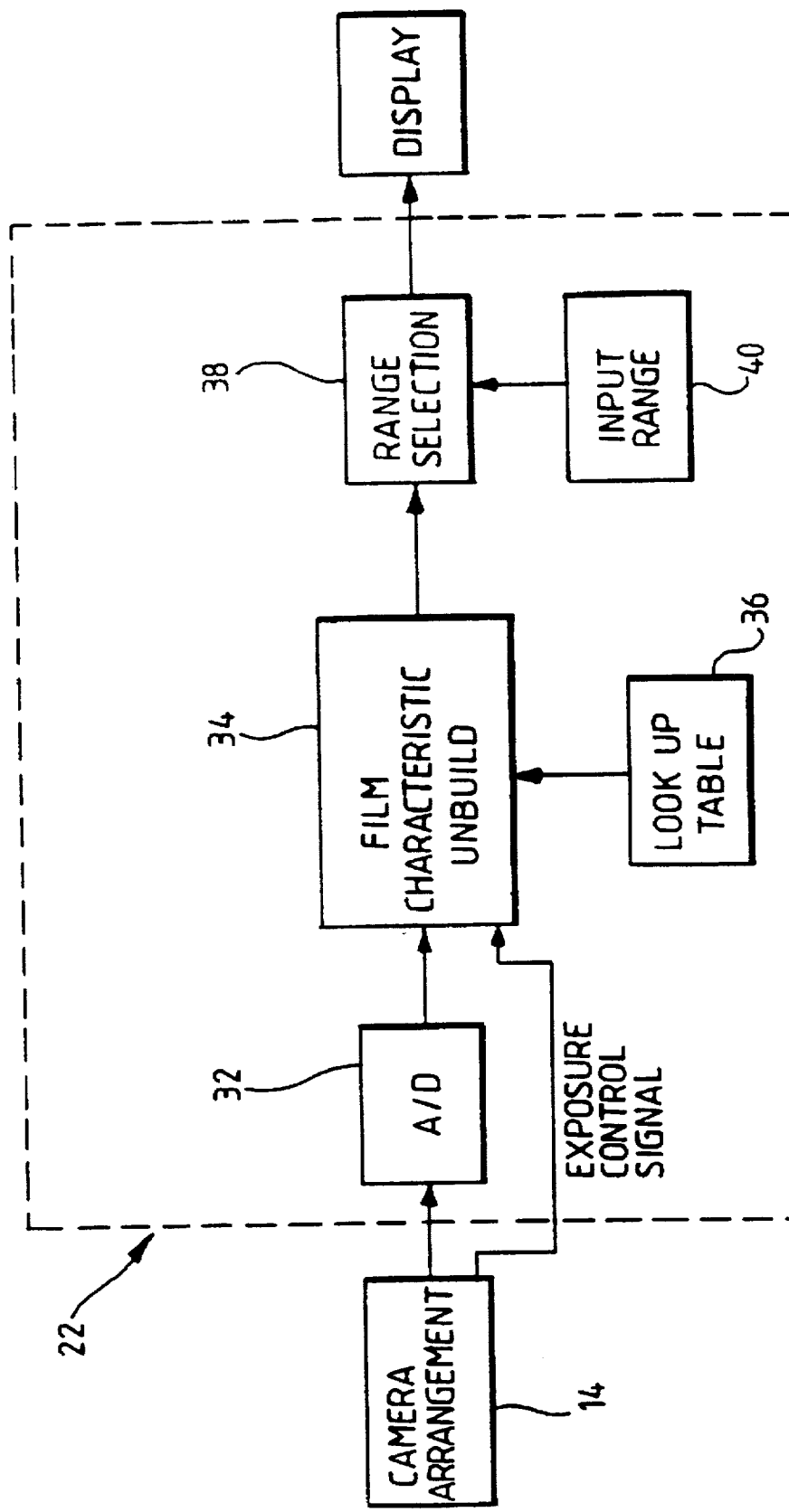
FIG. 7 is a block diagram illustrating the steps carried out by the processing unit of FIG. 6.

In FIG. 7, the processing unit 22 is shown. It comprises an analogue-to-digital converter 32 which converts the video output from the camera arrangement 14 into a digital signal. This digital signal is then processed to 'unbuild' the characteristic curve corresponding to the particular type of X-ray film being viewed. Unit 34 'straightens' out the curve as previously described with reference to FIG. 4 using the exposure control signal from the camera arrangement 14, and the curve characteristic fed into the unit 34 from a look up table 36. The look up table 36 may be loaded from an external source such as a film strip reader (not shown) which reads the process control strip directly.

After the film has been 'unbuilt', the display range is selected in unit 38, the desired range being set by unit 40 which may be operator-controlled. The output from the range selection unit 38 is then passed to the LCD display 24 or the television display 28. The range selection unit 38 is required for the display unit being used. The input to this unit provides values ranging from 1000 to 1. However, the display unit can only display values in the range 100 to 1. The unit 40 is utilised to determine which part of the curve is to be looked at.

Naturally, the processing unit 22 can be designed to carry out other image processing functions apart from the correction of contrast. Tone scale and image enhancement are also possible in the processing unit 22. Digital filters or image enhancement algorithms can also be utilised and have been shown to be particularly effective as an aid to the detection of cancers.

It will readily understood that the present invention is not limited to viewing X-ray films but may be utilised for viewing other types of photographic films.

It may be desirable to enhance the detection of foreign bodies in X-ray films, for example, glass fragments, by increasing the contrast over a narrow range of density values. False colour may also be used to emphasise differences in densities.

We claim:

1. A method of correcting the contrast of a processed photographic film material using its characteristic curve, the method comprising the steps of:

a) illuminating the film material;

b) capturing an image of the illuminated film material using an electronic camera unit;

c) producing an output signal corresponding the image captured by the camera unit;

d) correcting the contrast of the captured image signal to reveal hidden detail in the film; and e) displaying the corrected image of film, characterized in that step d) includes using the characteristic curve of the processed film material to correct the contrast, the characteristic curve of the material being defined by the equation:

$$D = \frac{D_s}{[1 + \{E_i/E\}^{\beta}/\alpha]^{\alpha}}$$

where

E is the exposure,
D is the density at exposure E,
$E_i$ is the exposure at the point of inflexion of the curve,
$D_s$ is the density at saturation, and
$\alpha$ and $\beta$ are characteristics relating to the processed photographic material.

2. Apparatus for correcting the contrast of a processed photographic film material using its characteristic curve, the apparatus comprising:

illumination means for illuminating the film material;

electronic camera means for capturing an image of the illuminated film material and for producing an output signal corresponding the image captured;

processing means for correcting the contrast of the captured image signal to reveal hidden detail in the film material; and display means for displaying the corrected image of film, characterized in that the processing means utilises the characteristic curve of the processed photographic material to correct the contrast, the characteristic curve of the material being defined by the equation:

$$D = \frac{D_s}{[1 + \{E_i/E\}^{\beta}/\alpha]^{\alpha}}$$

where

E is the exposure,
D is the density at exposure E,
$E_i$ is the exposure at the point of inflexion of the curve,
$D_s$ is the density at saturation, and
$\alpha$ and $\beta$ are characteristics relating to the processed photographic material.

* * * * *